(12) United States Patent
Wang et al.

(10) Patent No.: US 12,272,805 B2
(45) Date of Patent: Apr. 8, 2025

(54) SYSTEM AND METHOD FOR COOLING BATTERY CELLS

(71) Applicant: Apple Inc., Cupertino, CA (US)

(72) Inventors: Dapeng Wang, San Jose, CA (US); Jinjun Shi, San Jose, CA (US)

(73) Assignee: APPLE INC., Cupertino, CA (US)

( * ) Notice: Subject to any disclaimer, the term of this patent is extended or adjusted under 35 U.S.C. 154(b) by 799 days.

(21) Appl. No.: 17/314,547

(22) Filed: May 7, 2021

(65) Prior Publication Data

US 2022/0359925 A1    Nov. 10, 2022

(51) Int. Cl.
*H02J 7/00* (2006.01)
*H01M 10/48* (2006.01)
(Continued)

(52) U.S. Cl.
CPC ....... *H01M 10/635* (2015.04); *H01M 10/486* (2013.01); *H01M 10/613* (2015.04);
(Continued)

(58) Field of Classification Search
CPC ............... H02J 7/0045; H02J 7/007194; H02J 2310/48; H02J 7/00034; H02J 7/00036; H02J 7/00047; H02J 7/0048; H02J 7/0068; H02J 7/00714; H02J 7/007188; H02J 7/04; H02J 7/0029; H02J 7/00309; H02J 7/0031; H02J 7/007192; H02J 7/1423; H02J 7/24; H02J 7/0013; H02J 7/0042; H02J 7/005; H02J 7/35; H02J 2207/50; H02J 50/12; H02J 50/40; H02J 50/60; H02J 50/70; H02J 50/80; H02J 50/90; H02J 7/00306; H02J 7/00712; H02J 7/007182; H02J 7/02; H02J 7/0016; H02J 7/0018; H02J 7/0019; H02J 7/00302; H02J 7/00304; H02J 7/0049; H01M 10/647; H01M 10/6572; H01M 10/658; H01M 50/296; H01M 50/209; H01M 2220/30; H01M 10/613; H01M 2010/4271; H01M 10/482; H01M 2010/4278; H01M 2220/20; H01M 10/63; H01M 10/0525; H01M 10/4257
(Continued)

(56) References Cited

U.S. PATENT DOCUMENTS 6,891,353 B2   5/2005   Tsukamoto et al.
7,150,938 B2  12/2006   Munshi et al.
(Continued)

FOREIGN PATENT DOCUMENTS

CN    109802194 A    5/2019

OTHER PUBLICATIONS

Knobloch et al., "Control Enabling Solutions with Ultrathin Strain and Temperature Sensor System for Reduced Battery Life Cycle Cost," 2015.

*Primary Examiner* — Binh C Tat
(74) *Attorney, Agent, or Firm* — Fletcher Yoder, PC

(57) ABSTRACT

A battery system includes a battery cell, a thermoelectric cooler (TEC) that cools the battery cell, a temperature sensor that detects a temperature of the battery cell, and a battery management unit (BMU) controller. The BMU controller activates the TEC to cool the battery cell in response to determining that a state of charge (SOC) of the battery cell is greater than a threshold SOC and the temperature of the battery cell is greater than a threshold temperature.

20 Claims, 4 Drawing Sheets

(51) Int. Cl.
  *H01M 10/613* (2014.01)
  *H01M 10/635* (2014.01)
  *H01M 10/6572* (2014.01)

(52) U.S. Cl.
  CPC ....... *H01M 10/6572* (2015.04); *H02J 7/0048* (2020.01); *H01M 2220/30* (2013.01)

(58) Field of Classification Search
  USPC ................................................ 320/148–154
  See application file for complete search history.

(56) References Cited

U.S. PATENT DOCUMENTS

| | | |
|---|---|---|
| 7,592,776 B2 | 9/2009 | Tsukamoto et al. |
| 8,658,299 B2 | 2/2014 | Yang et al. |
| 8,722,222 B2 | 5/2014 | Kossakovski et al. |
| 8,901,892 B2 | 12/2014 | Yazami et al. |
| 9,599,584 B2 | 3/2017 | Yazami et al. |
| 9,666,914 B2 | 5/2017 | Bell et al. |
| 10,170,811 B2 | 1/2019 | Kossakovski et al. |
| 10,236,547 B2 | 3/2019 | Kossakovski et al. |
| 10,270,141 B2 | 4/2019 | Piggott et al. |
| 2008/0136364 A1 | 6/2008 | Calvarese |
| 2015/0357692 A1* | 12/2015 | Piggott ................. H02J 7/0068 29/623.2 |
| 2015/0372356 A1* | 12/2015 | Kossakovski ....... H01M 10/625 136/203 |
| 2016/0064972 A1 | 3/2016 | Stefanopoulou et al. |
| 2016/0240903 A1* | 8/2016 | Kossakovski ......... H01M 10/63 |
| 2017/0358831 A1* | 12/2017 | Milroy .............. H01M 10/6552 |
| 2020/0278245 A1 | 9/2020 | Brown et al. |
| 2020/0339010 A1* | 10/2020 | Villanueva .......... H01M 10/625 |

\* cited by examiner

SYSTEM AND METHOD FOR COOLING BATTERY CELLS

BACKGROUND

The present disclosure generally relates to a battery system of an electronic device, and more specifically to charging and cooling a battery cell of the battery system.

In an electronic device, such as a laptop, phone, or other portable electronic device, a battery system may be employed to provide power to operating components of the electronic device. The battery system may include a rechargeable battery cell, such as a lithium-ion battery cell, that powers the operating components of the electronic device at least when the electronic device is not connected (e.g., via an adapter or converter) to a separate power source, such as an electrical grid via a wall outlet, an external battery, a generator, and so on. The separate power source may be used at certain intervals to power the operating components of the electronic device and to replenish a charge of the battery cell for current or future use.

However, the battery cell of the battery system may generate heat and swell during charging, which may reduce a lifespan of the battery cell and/or a capacity of the battery cell. In particular, the battery cell may swell to a greater extent during charging as a temperature of the battery cell and a state of charge (SOC) of the battery cell increases.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a battery system includes a battery cell, a thermoelectric cooler (TEC) that cools the battery cell, a temperature sensor that detects a temperature of the battery cell, and a battery management unit (BMU) controller. The BMU controller activates the TEC to cool the battery cell in response to determining that a state of charge (SOC) of the battery cell is greater than a threshold SOC and the temperature of the battery cell is greater than a threshold temperature.

In another embodiment, a non-transitory, computer readable medium includes instructions stored thereon that, when executed by at least one processor, cause the at least one processor to determine whether a temperature of a battery cell exceeds a threshold temperature and determine whether a state of charge (SOC) of the battery cell exceeds a threshold SOC. The instructions also cause the at least one processor to activate a thermoelectric cooler (TEC) to cool the battery cell in response to determining that the temperature exceeds the threshold temperature and the SOC exceeds the threshold SOC.

In yet another embodiment, a method for controlling a battery system includes determining whether a temperature of a battery cell of the battery system exceeds a threshold temperature. The method also includes determining whether a state of charge (SOC) of the battery cell exceeds a threshold SOC. The method also includes activating a thermoelectric cooler (TEC) to cool the battery cell in response to determining that the SOC exceeds the threshold SOC and the temperature exceeds the threshold temperature.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
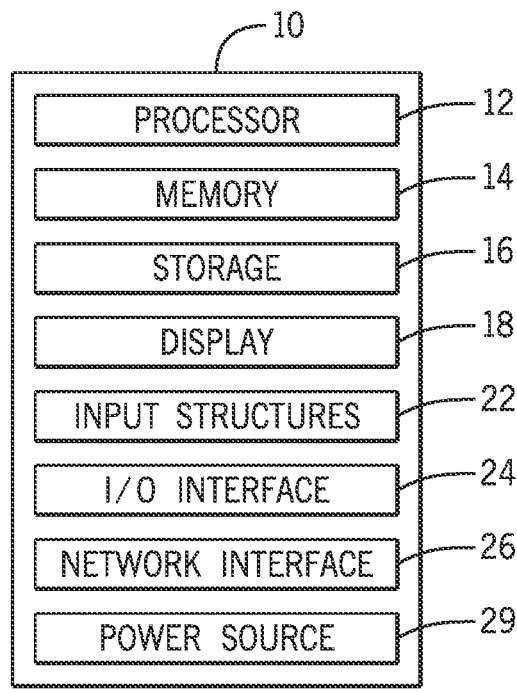
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

The disclosure is directed to charging and cooling a battery cell of a battery system. For example, an electronic device, such as a laptop, phone, or other portable electronic device, may include a battery system having a rechargeable battery cell that supplies power to operating components of the electronic device at least when the electronic device is not connected (e.g., via a wired or wireless connector, an adapter, or converter) to a separate power source, such as an electrical grid via a wall outlet, an external battery, a generator, and so on. While certain instances in the description below refer to the battery system having a battery cell, it should be understood that the present disclosure also encompasses battery systems employing multiple battery cells.

The battery cell of the battery system may generate heat and swell when used to power the operating components of the electronic device and when the battery cell is being charged. Heating and swelling of the battery cell, particularly during charging, may reduce a lifespan and a capacity of the battery cell. For example, while the battery cell may be designed with a rated capacity representing a charging capacity (e.g., a maximum charging capacity) of the battery cell at initial operation, the capacity of the battery cell may be reduced over the lifespan of the battery cell at least in part due to effects caused by heating and swelling of the battery cell, use of the battery cell over time, changes to an electrode structure of the battery cell through structural disordering arising from movement of lithium-ions in and out of the electrode structure over time, and the like. It should be noted that the term "rated capacity" used herein refers to the maximum charging capacity of the battery cell at initial operation, whereas "full current capacity" used herein refers to the maximum charging capacity of the battery cell at a given (e.g., current) point in time. That is, the full current capacity of the battery cell may degrade or decrease from the rated capacity of the battery cell over the lifespan of the battery cell. Further, the lifespan of the battery cell may be dependent on the full current capacity of the battery cell. For example, the lifespan of the battery cell may end when the full current capacity of the battery cell degrades from the rated capacity beyond a threshold capacity. However, other characteristics may additionally or alternatively end the lifespan of the battery cell, such as the battery cell swelling an amount that exceeds a swelling threshold.

As noted above, the battery cell may tend to generate heat and swell while being charged. The battery cell may swell to a greater extent as a state of charge (SOC) of the battery cell and a temperature of the battery increases, where SOC refers to a level (e.g., percentage) of charge of the battery cell relative to the full current capacity of the battery cell. For example, trickle or float charging, as defined herein, may include charging the battery having an SOC at or near the full current capacity at a rate equal to a self-discharge rate of the battery, thus enabling the battery to remain at the SOC at or near the full current capacity. However, trickle or float charging may heat the battery cell and cause the battery cell to swell to a greater extent than charging the battery cell at a lower SOC and/or lower temperature. In an effort to mitigate the effects of swelling on the lifespan of the battery cell, traditional techniques may block the battery cell from being charged to full current capacity. For example, traditional techniques may block the battery cell from being charged over 95% or 98% SOC.

Unfortunately, traditional techniques that block the battery cell from being charged to full current capacity result in the battery cell being fully discharged more quickly than if the battery cell had been charged to full current capacity. Further, traditional techniques that merely disable charging of the battery cell prior to the battery cell reaching full current capacity may not adequately reduce an elevated temperature of the battery cell. Thus, the elevated temperature of the battery cell may contribute to swelling of the battery cell even if the battery cell is blocked from being charged to full current capacity.

Embodiments herein provide various apparatuses and techniques to reduce heating and swelling of a battery cell while the battery cell is being charged to (or close to) full current capacity (e.g., float or trickle charged). For example, a thermoelectric cooler (TEC) (e.g., a Peltier device) may be employed to cool the battery cell of the battery system. A battery management unit (BMU) controller of the battery system may activate the TEC to cool the battery cell in response to certain battery conditions. For example, the BMU controller may determine the SOC of the battery cell and a temperature of the battery cell. A temperature sensor, such as a thermocouple, may be coupled with the battery cell and communicatively coupled to the BMU controller to enable the BMU controller to determine the temperature of the battery cell. The BMU controller may activate the TEC to cool the battery cell in response to determining that the SOC of the battery exceeds a threshold SOC (e.g., corresponding to float or trickle charging) and the temperature of the battery cell exceeds a first threshold temperature (e.g., an upper threshold temperature). If the BMU controller determines that the SOC does not exceed the threshold SOC, the BMU controller may enable charging of the battery cell under "normal" charging conditions and without activating the TEC to cool the battery cell. It should be noted that "normal charging" or "normal charging conditions," as used herein, refers to non-trickle charging of the battery cell.

After the BMU controller activates the TEC to cool the battery cell in response to determining that the SOC of the battery cell exceeds the threshold SOC and the temperature of the battery cell exceeds the first threshold temperature (e.g., the upper threshold temperature), the BMU controller may continue to monitor the temperature of the battery cell. If the BMU controller determines that the temperature of the battery cell is below the first threshold temperature (e.g., the upper threshold temperature), the BMU controller may determine whether the temperature of the battery cell is above or below a second threshold temperature (e.g., a lower threshold temperature). The BMU controller may enable trickle charging of the battery cell in response to determining that the temperature of the battery cell is less than the first threshold temperature (e.g., the upper threshold temperature) and greater than the second threshold temperature (e.g., the lower threshold temperature). If the BMU controller determines that the temperature of the battery cell is below the second threshold temperature (e.g., the lower threshold temperature), the BMU controller may de-activate the TEC or ensure the TEC is not activated, and then enable trickle charging of the battery cell.

The TEC and above-described control scheme may be employed to reduce heating and swelling of the battery cell, particularly during float or trickle charging of the battery cell. Further, the above-described control scheme enables the battery cell to be trickle-charged to full current capacity (e.g., 100% SOC). In general, presently disclosed embodiments may improve a lifespan of the battery cell by reducing negative effects associated with elevated temperatures and swelling of the battery cell, and may improve a performance of the battery cell relative to certain traditional embodiments (e.g., by enabling the battery cell to be trickle-charged to or near full current capacity). These and other features are described in detail below with reference to the drawings.

FIG. 1 is a block diagram of an electronic device 10, according to an embodiment of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices.

It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a 3rd generation (3G) cellular network, universal mobile telecommunication system (UMTS), 4th generation (4G) cellular network, long term evolution (LTE®) cellular network, long term evolution license assisted access (LTE-LAA) cellular network, 5th generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

The power source 29 of the electronic device 10 may include any suitable source of power, such as a rechargeable lithium polymer (Li-poly) battery and/or an alternating current (AC) power converter. In accordance with embodiments of the present disclosure, the power source 29 may include a battery system having a rechargeable battery cell, such as the above-described rechargeable Li-poly (or lithium-ion) battery cell, and a thermoelectric cooler (TEC) used to cool the rechargeable battery before and/or during a battery charging procedure. The TEC may be operated to cool the rechargeable battery cell in response to an analysis of detected parameters of the battery cell, such as state of charge (SOC) and temperature of the battery cell. For example, a battery management unit (BMU) controller may activate operation of the TEC to cool the battery cell in response to determining that the SOC of the battery cell is higher than a threshold SOC and the temperature of the battery cell is higher than an upper threshold temperature. The BMU controller may also enable the TEC to continue cooling the battery cell until the temperature of the battery cell is reduced below a lower threshold temperature. These and other features are described in detail below with reference to FIGS. 2-6.

Figure 2:
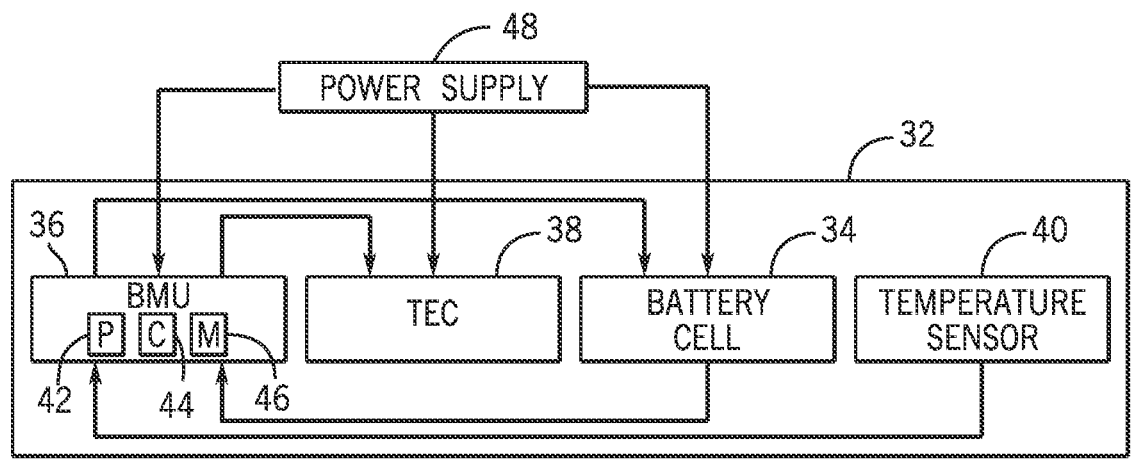
FIG. 2 is a block diagram of a battery system of the electronic device of FIG. 1, according to an embodiment of the present disclosure.

FIG. 2 is a block diagram of an embodiment of a battery system 32 of the electronic device 10 of FIG. 1. In the illustrated embodiment, the battery system 32 includes a battery cell 34, a battery management unit (BMU) controller 36 that controls aspects of the battery system 32, and a thermoelectric cooler (TEC) 38 (e.g., a Peltier device) controlled by the BMU controller 36 to cool (e.g., reduce a temperature of) the battery cell 34. The battery system 32 may also include a temperature sensor 40, such as a thermocouple, that detects a temperature of the battery cell 34 or otherwise enables the BMU controller 36 to determine the temperature of the battery cell 34. For example, if the temperature sensor 40 is a thermocouple, the temperature sensor 40 may produce a temperature-dependent voltage across two dissimilar electrical conductors, and the BMU controller 36 may be read the temperature-dependent voltage and determine the temperature of the battery cell 34 therefrom. However, other types of the temperature sensor 40 are also possible, such as a thermistor (e.g., having a temperature-dependent resistance that enables determining the temperature of the battery cell 34) or an infrared sensor.

It should be noted that, in some embodiments, the battery system 32 may include multiple instances of the battery cell 34 and multiple instances of the temperature sensor 40 corresponding to the multiple instances of the battery cell 34. Further, in embodiments employing multiple instances of the battery cell 34, the TEC 38 of the battery system 32 may cool the multiple instances of the battery cell 34, or the battery system 32 may include multiple instances of the TEC 38 corresponding to the multiple instances of the battery cell 34.

The battery cell 34 of the battery system 32 may be charged by an external power source 48, such as an electrical grid via a wall outlet, an external battery, a generator, and so on. The battery system 32 may be coupled to the power source 48 via an adapter, converter, or connector (e.g., wired or wireless) associated with the electronic device 10 of FIG. 1. The power source 48 may power the BMU controller 36 when the power source 48 is connected to the battery system 32, although the BMU controller 36 may be powered by the battery cell 34 when the power source 48 is not connected to the battery system 32. In some embodiments, the temperature sensor 40 may be self-powered, meaning that the temperature sensor 40 may operate without an external power source. For example, thermocouples and thermistors may be self-powered.

The BMU controller 36 may include processing circuitry 42, communication circuitry 44, and memory circuitry 46. The processing circuitry 42 may execute instructions stored on the memory circuitry 46 to perform various functions associated with the battery system 32, and may be in the form of or similar to the processor 12. Similarly, the memory circuitry 46 may be in the form of or similar to the memory 14. The communication circuitry 44 may enable the BMU controller 36 to communicate (e.g., via wired or wireless connections) with various componentry, and may be in the form of or similar to the network interface 26. For example, the communication circuitry 44 may enable the BMU controller 36 to communicate with (e.g., control) the TEC 38. In particular, the BMU controller 36 selectively activate the TEC 38 to cool the battery cell 34 during certain operating conditions. In one embodiment, after the battery system 32 is connected to the power source 48, the BMU controller 36 may activate the TEC 38 to cool the battery cell 34 in response to determining, via the processing circuitry 42, that a state of charge (SOC) of the battery cell 34 exceeds a threshold SOC and a temperature of the battery cell 34 exceeds a first threshold temperature (e.g., an upper threshold temperature). The threshold SOC may be close to a full current capacity of the battery cell 34 (e.g., corresponding to a condition commonly referred to as float or trickle charging), such as 90% or 95% SOC. The first threshold temperature (e.g., upper threshold temperature) may include any suitable temperature that is characteristic of the battery cell 34 generating excessive heat and/or swelling excessively sufficient to reduce a lifespan of the battery cell 34 and/or a capacity of the battery cell 34. For example, the upper threshold temperature may be in the range of 40-50 degrees Celsius, such as approximately 45 degrees Celsius, although the first threshold temperature may vary based on the size, geometry, chemistry, and other characteristics of the battery cell 34.

If the SOC of the battery cell 34 detected by the BMU controller 36 is below the threshold SOC, the BMU controller 36 may enable the power source 48 to trickle charge the battery cell 34 without activating the TEC 38. However, in certain operating conditions (e.g., where the SOC of the battery cell 34 detected by the BMU controller 36 is above the threshold SOC and the temperature of the battery cell 34 is above the first threshold temperature), the BMU controller 36 may activate the TEC 38 to cool the battery cell 34 prior to enabling the power source 48 to trickle charge the battery cell 34. For example, prior to enabling the external power source 48 to trickle charge the battery cell 34, the BMU controller 36 may monitor the temperature of the battery cell 34 (e.g., via the temperature sensor 40) until the temperature of the battery cell 34 is reduced by operation of the TEC 38 below the first threshold temperature (e.g., upper threshold temperature).

If the BMU controller 36 determines that the temperature of the battery cell 34 is below the first threshold temperature (e.g., upper threshold temperature) and above a second threshold temperature (e.g., lower threshold temperature), the BMU controller 36 may enable the external power source 48 to trickle charge the battery cell 34 (e.g., while the TEC 38 continues operation to cool the battery cell 34). Once the temperature of the battery cell 34 is reduced below the second threshold temperature (e.g., lower threshold temperature), the BMU controller 36 may de-activate the TEC 38 from cooling the battery cell 34 while the BMU controller 36 enables (or continues to enable) the power source 48 to trickle charge the battery cell 34. The lower threshold temperature may include any suitable temperature that is characteristic of the battery cell 34 being sufficiently cool to avoid negatively impacting a lifespan of the battery cell 34 and/or a capacity of the battery cell 34. Additionally or alternatively, the lower threshold temperature may be sufficiently low such that the TEC 38, in operation, may not reduce the temperature of the battery cell 34 any further. While the BMU controller 36 may activate and deactivate the TEC 38 as described, it should be noted that the TEC 38 may be powered by the power supply 48.

The features described above with respect to FIG. 1 provide a general overview regarding operation of the battery system 32 in accordance with the present disclosure. In general, the battery system 32 operates such that the battery cell 34 is temperature-controlled before and during float or trickle charging of the battery cell 34 (e.g., when the SOC of the battery cell 34 is above 90% or above 95%). In contrast with traditional techniques, the disclosed techniques and corresponding componentry enable the battery cell 34 to be trickle charged at or close to full current capacity while the temperature of the battery cell 34 is maintained at desirable levels, thereby reducing swelling of the battery cell 34. In doing so, the lifespan of the battery cell 34 may be improved, degradation of the capacity of the battery cell 34 may be reduced or negated, and a performance of the battery cell 34 may be improved relative to traditional embodiments. Details regarding geometric and control features of the above-described battery system 32 are provided in detail below with reference to FIGS. 3-6.

Figure 3:
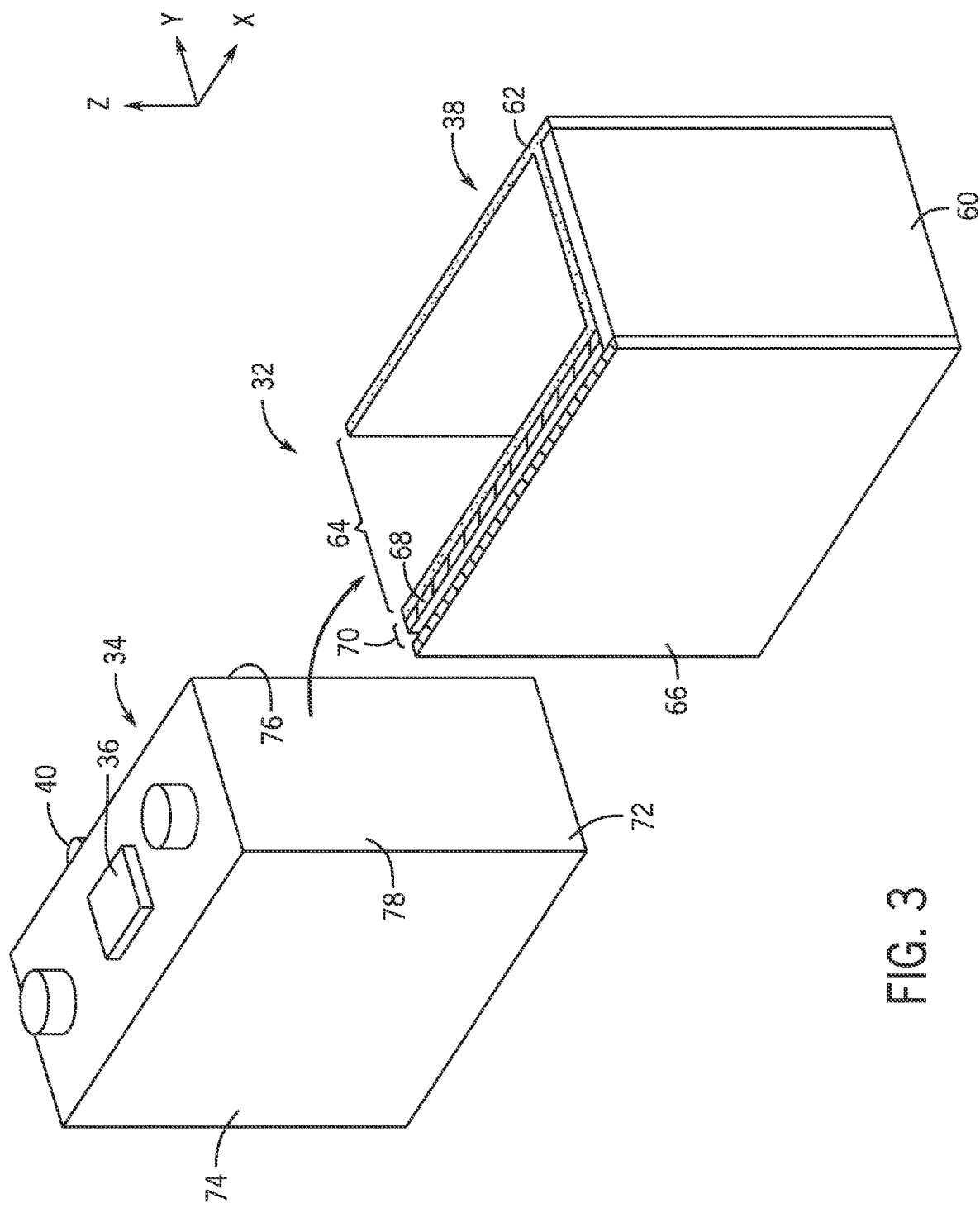
FIG. 3 is an exploded perspective view of the battery system of FIG. 2, according to an embodiment of the present disclosure.

FIG. 3 is an exploded perspective view of an embodiment of the battery system 32 of FIG. 2. As previously described, the battery system 32 includes the battery cell 34, the BMU controller 36, the TEC 38, and the temperature sensor 40. In the illustrated embodiment, the TEC 38 includes an active element 60, a cold plate 62 coupled to the active element 60 and arranged to define a receptacle 64 that receives the battery cell 34, a hot plate 66 coupled to the active element 60, and a thermal insulating layer 68 disposed in a gap 70 between a portion of the cold plate 62 and the hot plate 66. The thermal insulating layer 68 may include a material, such as an insulating polymer, that blocks heat transfer from the hot plate 66 to the cold plate 62. In the illustrated embodiment, the battery cell 34 may include a housing 72 that houses various components of the battery cell 34 (e.g., electrodes, a separator, and electrolyte) and contacts the cold plate 62 when the battery cell 34 is disposed in the receptacle 64 defined by the cold plate 62. For example, the cold plate 62 may contact at least a first broad side 74 of the housing 72, a second broad side 76 of the housing 72 opposing the first broad side 74, and a thin side 78 of the housing 72 extending between the first broad side 74 and the second broad side 76.

The active element 60 of the TEC 38, referred to in certain instances of the present disclosure as a Peltier device, may include two types of semiconductors (e.g., n-type and p-type) arranged in an alternating order, thermally parallel to each other, and electrically in series. Further, the two types of semiconductors may be joined via the cold plate 62 and the hot plate 66 extending along either side of the two types of semiconductors (or via a separate cold plate and hot plate associated with the active element 60, where the separate cold plate is connected to the illustrated cold plate 62 and the separate hot plate is connected to the illustrated hot plate 66).

Applying a voltage (e.g., via the BMU controller 36) to free ends of the two types of semiconductors may cause a temperature difference between the cold plate 62 and the hot plate 66. That is, applying the voltage may cause the cold plate 62 to be cooled and the hot plate 66 to be heated. The cold plate 62, which defines the receptacle 64 that receives the battery cell 34 as described above, may cool the battery cell 34. The hot plate 66 may be coupled to an enclosure of the electronic device 10 illustrated in FIG. 1, such as a laptop enclosure, such that heat is dissipated from the hot plate 66 to the enclosure. Further, the gap 70 formed between the cold plate 62 and the hot plate 66, and the thermal insulating layer 68 disposed in the gap 70, may operate to insulate the cold plate 62 from the hot plate 66 to block the hot plate 66 from heating the cold plate 62. In other words, the illustrated arrangement concentrates the heat generated by the TEC 38 away from the battery cell 34. Further, the illustrated arrangement enables a large amount of contact between the cold plate 62 of the TEC 38 and the housing 72 of the battery cell 34, improving heat transfer from the housing 72 of the battery cell 34 to the cold plate 62 of the TEC 38 relative to embodiments having less contact.

Figure 4:
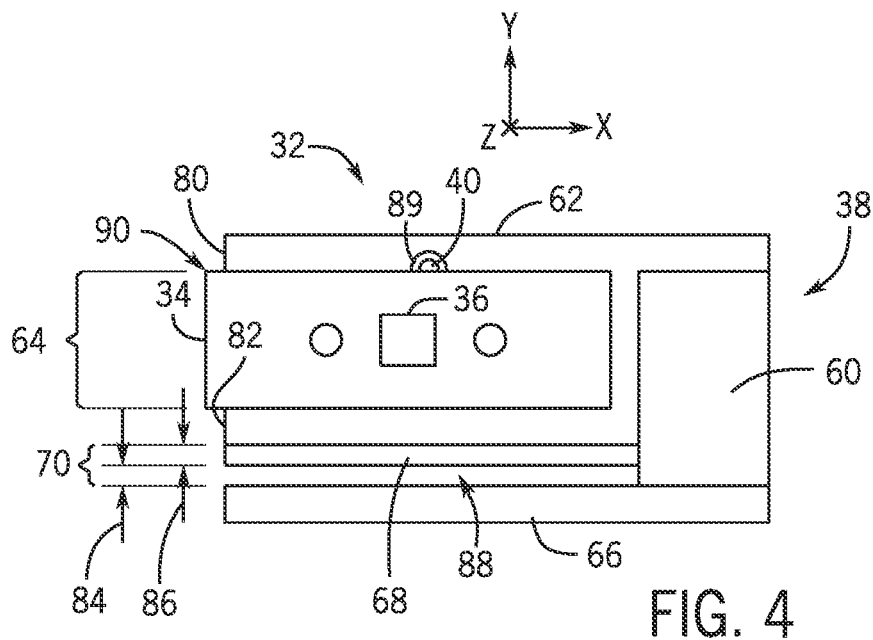
FIG. 4 is a side view of the battery system of FIG. 2, according to an embodiment of the present disclosure.
Figure 5:
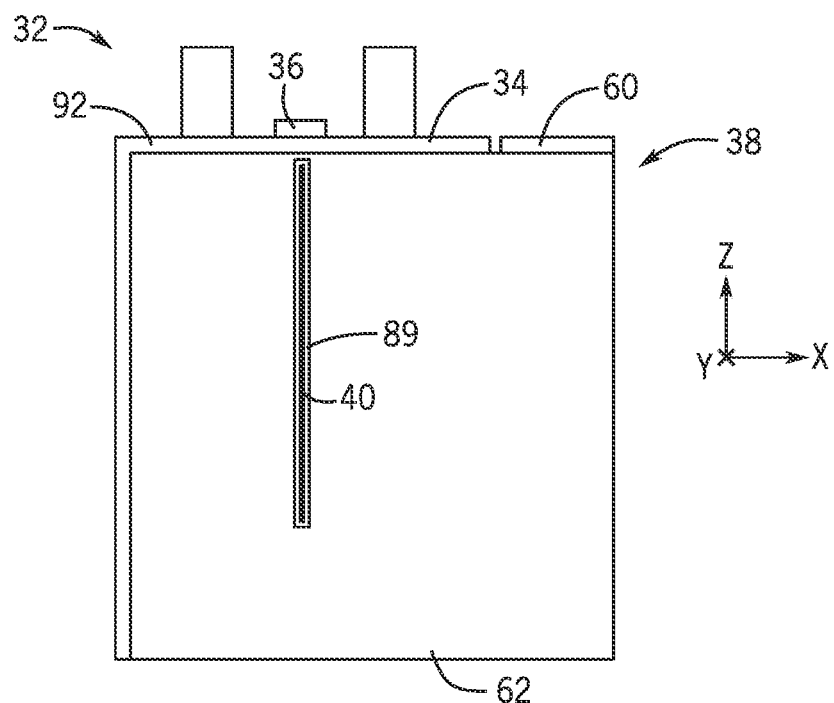
FIG. 5 is a top view of the battery system of FIG. 2, according to an embodiment of the present disclosure.

FIG. 4 is a side view of an embodiment of the battery system 32 of FIG. 2 and FIG. 5 is a top view of an embodiment of the battery system 32 of FIG. 2. The illustrations of the battery system 32 in FIGS. 4 and 5 clarify certain of the features described above with respect to FIG. 3. For example, as shown in FIG. 4, the cold plate 62 includes a first arm 80 and a second arm 82 defining the receptacle 64 in which the battery cell 34 is received. The thermal insulating layer 68 is disposed in the gap 70 formed between the second arm 82 of the cold plate 62 and the hot plate 66. As shown, the gap 70 between the second arm 82 of the cold plate 62 and the hot plate 66 may include a first width 84 that is greater than a second width 86 of the thermal insulating layer 68. Accordingly, a space 88 is formed between the thermal insulating layer 68 and the hot plate 66 that may improve thermal decoupling of the cold plate 62 and the hot plate 66 and enable a moderate amount of swelling of the battery cell 34 toward the hot plate 66. For example, the gap 70, the thermal insulating layer 68, and the space 88 may be sized to enable the battery cell 34 to swell up to 10% of an initial thickness of the battery cell 34.

As previously described, the thermal insulating layer 68 may include a material, such as insulating polymer that blocks heat transfer from the hot plate 66 toward the cold plate 62 (e.g., the second arm 82 of the cold plate 62). While the thermal insulating layer 68 is coupled to the second arm 82 of the cold plate 62 in FIG. 4 (e.g., via a thermally conductive paste), the thermal insulating layer may be coupled to the hot plate 66 in certain embodiments. Further, as shown in FIGS. 4 and 5, the temperature sensor 40 may be in intimate contact with the battery cell 34 and thermally insulated from the cold plate 62 via a thermal insulating wrap 89. While the thermal insulating wrap 89 separates the temperature sensor 40 from the cold plate 62, the thermal insulating wrap 89 may not extend between the temperature sensor 40 and the battery cell 34 to enable the temperature sensor 40 to maintain intimate contact with the battery cell 34 for accurate temperature measurement of the battery cell 34. The thermal insulating wrap 89 may include the same material as the thermal insulating layer 68.

In both FIGS. 4 and 5, the battery cell 34 is illustrated as extending beyond the cold plate 62 of the TEC 38. For example, in FIG. 4, an end 90 of the battery cell 34 extends beyond the first arm 80 and the second arm 82 of the cold plate 62. Further, in FIG. 5, a terminal end 92 of the battery cell 34 extends beyond the cold plate 62. In general, the end 90 and the terminal end 92 of the battery cell 34 may be unbound by the cold plate 62 and/or extend beyond the cold plate 62, as noted above, to enable the end 90 and the terminal end 92 to thermally expand (e.g., swell) outside of the cold plate 62. However, in certain embodiments, the battery cell 34 may not extend beyond the cold plate 62 of the TEC 38. As described above, in general, the battery system 32 may be geometrically arranged to enhance heat transfer from the battery cell 34 to the TEC 38, and from the hot plate 66 of the TEC 38 to an enclosure of the electronic device 10 of FIG. 1.

Figure 6:
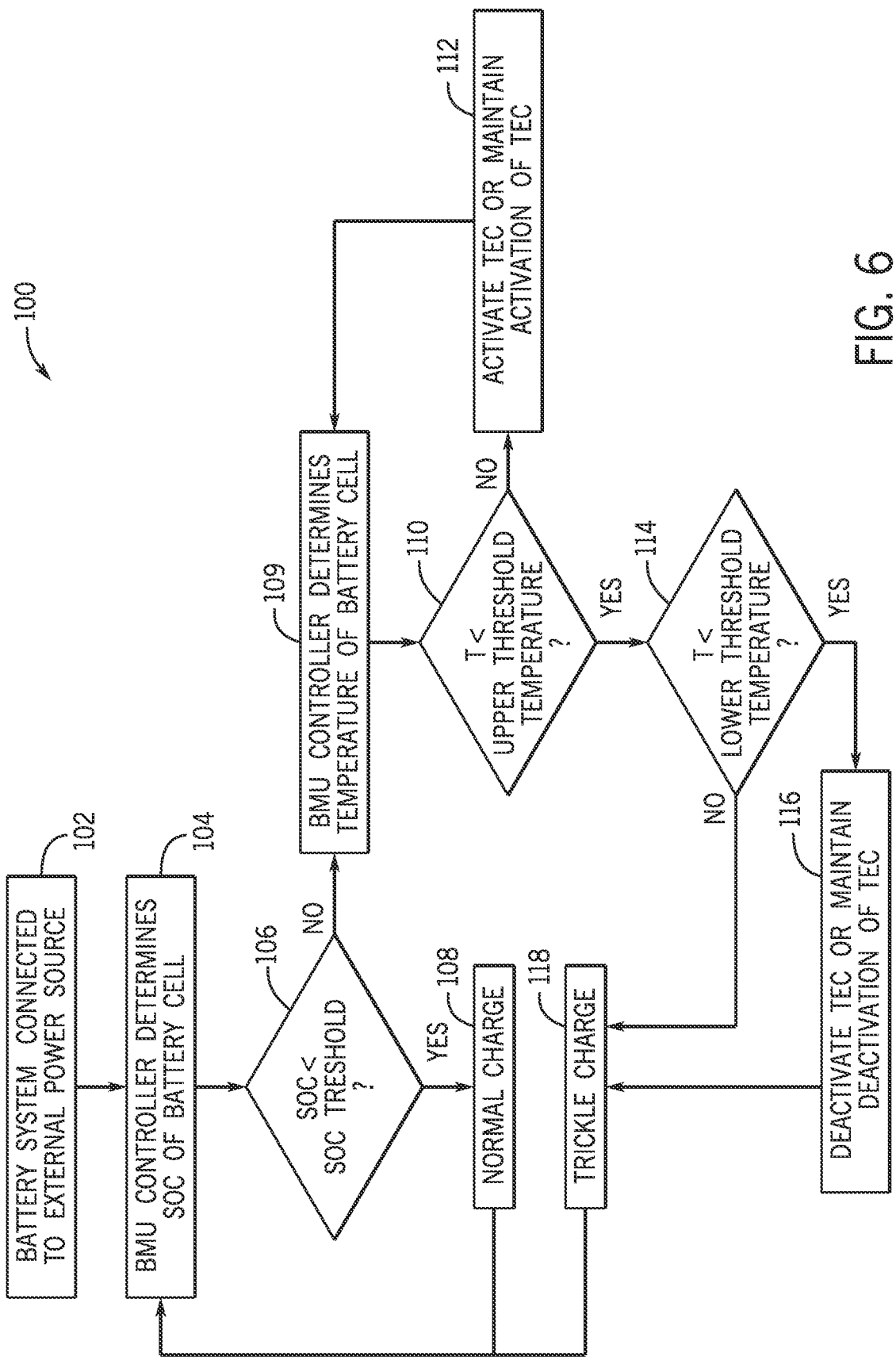
FIG. 6 is a process flow diagram of a method of cooling and charging a battery cell of the battery system of FIG. 2, according to an embodiment of the present disclosure.

FIG. 6 is a process flow diagram illustrating an embodiment of a method 100 of cooling and trickle charging the battery cell 34 of the battery system 32 of FIG. 2. It should be noted that certain reference numerals (e.g., corresponding to structural features) introduced in earlier drawings and not illustrated in the method 100 of FIG. 6 will be included in the description below. In general, the illustrated method 100 is employed to enable cooling of the battery cell 34 before and during charging of the battery cell 34 when the SOC of the battery cell 34 is close to full current capacity (e.g., commonly referred to as float or trickle charging) and when the temperature of the battery cell 34 is elevated to a certain degree. While the process blocks of the method 100 are shown in a particular sequence, it should be understood that, in some embodiments, the process blocks may be performed in different orders, and some process blocks may be skipped altogether.

In particular, in process block 102, the method 100 begins with the battery system 32 being connected (e.g., via an adapter, converter, or connector) to the external power source 48, such as an electrical grid via a wall out, an external battery, a generator, and so on. In general, the disclosed cooling features of the battery system 32 are employed when the battery system 32 is connected to the external power source 48 (e.g., immediately before trickle-charging and/or during trickle-charging of the battery cell 34).

In process block 104, the BMU controller 36 determines the SOC of the battery cell 34. In process block 106, the BMU controller 36 determines whether the SOC of the battery cell 34 is less than a threshold SOC. The threshold SOC may be, for example, 90% or 95% (e.g., of the full current capacity of the battery cell 34). In general, the threshold SOC is selected to correspond to float or trickle charging of the battery cell 34 (e.g., close to the full current capacity of the battery cell 34). While 90% or 95% SOC are provided as example threshold SOCs, the threshold SOC may vary depending on the embodiment.

If the BMU controller 36 determines at the process block 106 that the SOC of the battery cell 34 is less than the threshold SOC, the BMU controller 36 enables the external power source 48 to charge the battery cell 34 under normal charging conditions, as illustrated in process block 108, while the TEC 38 is not in operation to cool the battery cell 34. That is, when the SOC of the battery cell 34 is less than the threshold SOC, the BMU controller 36 enables the external power source 48 to charge the battery cell 34 under normal charging conditions without activating the TEC 38 to cool the battery cell 34. The method 100 may then progress back to the process block 104, where the BMU controller 36 determines the SOC of the battery cell 34, and then to process block 106, where the BMU controller 36 determines whether the SOC of the battery cell 34 is less than the threshold SOC.

If the BMU controller 36 determines at the process block 106 that the SOC of the battery cell 34 is greater than the threshold SOC, the BMU controller 36 determines, at process block 109, the temperature of the battery cell 34. For example, as previously described, the battery system 32 may include the temperature sensor 40. The BMU controller 36 may receive a signal (e.g., analog or digital signal) from the temperature sensor 40 indicative of the temperature of the battery cell 34, or the BMU controller 36 may read an electric characteristic (e.g., temperature-dependent voltage or temperature-dependent resistance) of the temperature sensor 40 and determine the temperature of the battery cell 34 based on the electric characteristic.

At process block 110, the BMU controller 36 may determine whether the temperature of the battery cell 34 is less than a first threshold temperature, also referred to herein as an upper threshold temperature. The upper threshold temperature may be any suitable temperature that is characteristic of the battery cell 34 generating excessive heat and/or swelling excessively sufficient to reduce a lifespan of the battery cell 34 and/or a capacity of the battery cell 34. For example, the upper threshold temperature may be in the range of 40-50 degrees Celsius, such as approximately 45 degrees Celsius. However, the upper threshold temperature may vary based on the size, geometry, chemistry, and other factors of the battery cell 34.

At process block 112, the BMU controller 36 activates (e.g., turns on) the TEC 38 to cool the battery cell 34 in response to determining at the process block 110 that the temperature of the battery cell 34 is greater than the upper threshold temperature. It should be noted that, in certain instances, the BMU controller 36 may activate the TEC 38 to cool the battery cell 34 at the process block 112 prior to the BMU controller 36 enabling the external power source 48 to trickle-charge the battery cell 34. After activating the TEC 38 to cool the battery cell 34, the BMU controller 36 again determines the temperature of the battery cell 34 at the process block 109 and compares the temperature to the upper threshold temperature at the process block 110. If the BMU controller 36 determines that the temperature of the battery cell 34 is still above the upper threshold temperature, the TEC 38 may continue running to cool the battery cell 34 at the process block 112. If the BMU controller 36 determines that the temperature of the battery cell 34 is below the upper threshold temperature, the method 100 proceeds to process block 114.

At the process block 114, the BMU controller 36 determines whether the temperature of the battery cell 34 is less than a second threshold temperature, referred to below as a lower threshold temperature. In some instances, the TEC 38 may be in operation to cool the battery cell 34 as the BMU controller 36 initiates the process block 114, while in other instances, the TEC 38 may not be in operation to cool the battery cell 34 as the BMU controller 36 initiates the process block 114. For example, in a first instance where the BMU controller 36 determines at the process block 110 that the temperature of the battery cell 34 is less than the first threshold temperature prior to activating the TEC 38 to cool the battery cell 34, the TEC 38 is not running when the process block 114 occurs. However, in a second instance where the BMU controller 36 determines at the process block 110 that the temperature of the battery cell 34 is less than the first threshold temperature only after having activated the TEC 38 to cool the battery cell 34, the TEC 38 is running when the process block 114 occurs. The distinction between the above-described first instance and second instance is based on the likelihood that the temperature of the battery cell 34 in the second instance, while lower than the first threshold temperature, is close to the first threshold temperature and could exceed the first threshold temperature in the near future (e.g., due to trickle-charging). In contrast, in the first instance, the temperature of the battery cell 34 may be substantially lower than the first threshold temperature (e.g., lower than the temperature of the battery cell 34 in the second instance) and may not exceed the first threshold temperature in the near future.

In either instance, at the process block 114, the BMU controller 36 determines whether the temperature is less than the lower threshold temperature. The lower threshold temperature may include any suitable temperature that is characteristic of the battery cell 34 being sufficiently cool to avoid negatively impacting a lifespan of the battery cell 34 and/or a capacity of the battery cell 34. Additionally or alternatively, the lower threshold temperature may be sufficiently low such that the TEC 38, in operation, may not reduce the temperature of the battery cell 34 any further. For example, the lower threshold temperature may be in the range of −15 to 15 degrees Celsius, such as approximately 12 degrees Celsius, approximately −12 degrees Celsius, and so on, although the lower threshold temperature may vary based on the size, geometry, chemistry, and other characteristics of the battery cell 34.

If the BMU controller 36 determines at the process block 114 that the temperature of the battery cell 34 is less than the lower threshold temperature, then the BMU controller 36 deactivates the TEC 38 (or ensures the TEC 38 is deactivated) at process block 116. The BMU controller 36 then enables the external power source 48 to trickle-charge the battery cell 34 at process block 118. If the BMU controller 36 determines at the process block 114 that the temperature of the battery cell 34 is greater than the lower threshold temperature, then the BMU controller 36 enables the external power source 48 to trickle-charge the battery cell 34 at the process block 118 (e.g., without turning off the TEC 38 or ensuring that the TEC 38 is turned off). The method 100 may then progress from the process block 118 back to the process block 104, where the BMU controller determines the SOC of the battery cell 34.

The technical effects of the present disclosure include extending a lifespan of a battery system by reducing heating and swelling of a battery cell of a battery system before and during a battery charging procedure (e.g., during float or trickle charging) that enables the battery cell to reach full current capacity. Disclosed embodiments may improve the lifespan of the battery cell and corresponding battery system, reduce or negate degradation of the capacity of the battery cell over time, and improve a performance of the battery cell relative to traditional embodiments.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A battery system, comprising:
   a battery cell;
   a thermoelectric cooler (TEC) configured to cool the battery cell;
   a temperature sensor configured to detect a first temperature of the battery cell; and
   a battery management unit (BMU) controller configured to activate the TEC to cool the battery cell in response to determining that a state of charge (SOC) of the battery cell is greater than a threshold SOC and the first temperature of the battery cell is greater than a first threshold temperature.

2. The battery system of claim 1, wherein the temperature sensor is configured to detect a second temperature of the battery cell after the BMU controller activates the TEC, the BMU controller is configured to deactivate the TEC in response to determining that the second temperature of the battery cell is less than a second threshold temperature, and the second threshold temperature is less than the first threshold temperature.

3. The battery system of claim 1, wherein the temperature sensor is configured to detect a second temperature of the battery cell after the BMU controller activates the TEC, the BMU controller is configured to enable charging of the battery cell while the TEC is activated in response to determining that the second temperature of the battery cell is greater than a second threshold temperature, and the second threshold temperature is less than the first threshold temperature.

4. The battery system of claim 3, wherein the second threshold temperature is within a range of −15 to 15 degrees Celsius.

5. The battery system of claim 1, wherein the threshold SOC of the battery cell is within a range of 90-95% of a full current capacity of the battery cell.

6. The battery system of claim 1, wherein the first threshold temperature is within a range of 40-50 degrees Celsius.

7. The battery system of claim 1, wherein the battery cell comprises a housing and electrodes disposed in the housing, wherein a cold plate extends from the TEC across a first side of the housing and a second side of the housing opposing the first side of the housing, and wherein a hot plate extends from the TEC adjacent to the second side of the housing and is separated from the cold plate via a gap.

8. The battery system of claim 7, comprising a thermal insulating layer positioned in the gap between the cold plate and the hot plate.

9. The battery system of claim 8, wherein a first width of the gap between the cold plate and the hot plate is greater than a second width of the thermal insulating layer.

10. The battery system of claim 1, wherein the battery cell comprises a lithium-ion battery cell.

11. A non-transitory, computer readable medium comprising instructions stored thereon that, when executed by at least one processor, cause the at least one processor to:
   determine whether a first temperature of a battery cell exceeds a first threshold temperature;
   determine whether a state of charge (SOC) of the battery cell exceeds a threshold SOC; and
   in response to determining that the first temperature exceeds the first threshold temperature and that the SOC exceeds the threshold SOC, activate a thermoelectric cooler (TEC) to cool the battery cell.

12. The non-transitory, computer readable medium of claim 11, wherein the instructions, when executed by the at least one processor, cause the at least one processor to deactivate the TEC in response to determining that a second temperature of the battery cell is less than a second threshold temperature, wherein the second threshold temperature is less than the first threshold temperature.

13. The non-transitory, computer readable medium of claim 11, wherein the instructions, when executed by the at least one processor, cause the at least one processor to enable charging of the battery cell while the TEC is activated in response to determining that a second temperature of the battery cell is greater than a second threshold temperature, wherein the second threshold temperature is less than the first threshold temperature.

14. The non-transitory, computer readable medium of claim 11, wherein the instructions, when executed by the at least one processor, cause the at least one processor to determine whether the battery cell is connected to an external power source and, in response to determining that the battery cell is connected to the external power source, determine whether the first temperature exceeds the first threshold temperature and the SOC exceeds the threshold SOC.

15. The non-transitory, computer readable medium of claim 11, wherein the threshold SOC of the battery cell is within a range of 90-95% of a full current capacity of the battery cell.

16. A method for controlling a battery system, comprising:
    determining, via processing circuitry, that a first temperature of a battery cell of the battery system exceeds a first threshold temperature;
    determining, via the processing circuitry, that a state of charge (SOC) of the battery cell exceeds a threshold SOC; and
    activating, via the processing circuitry, a thermoelectric cooler (TEC) to cool the battery cell in response to determining that the SOC exceeds the threshold SOC and the first temperature exceeds the first threshold temperature.

17. The method of claim 16, comprising de-activating, via the processing circuitry, the TEC in response to determining that a second temperature of the battery cell is less than a second threshold temperature, wherein the second threshold temperature is less than the first threshold temperature.

18. The method of claim 16, comprising charging, via the processing circuitry, the battery cell while the TEC is activated in response to determining that a second temperature of the battery cell is less than the first threshold temperature and greater than a second threshold temperature, wherein the second threshold temperature is less than the first threshold temperature.

19. The method of claim 16, comprising charging, via the processing circuitry, the battery cell in response to determining that the SOC is less than the threshold SOC.

20. The method of claim 16, wherein the threshold SOC is within a range of 90-95% of a full current capacity of the battery cell.

* * * * *